US009090407B2

(12) United States Patent
Matsumoto et al.

(10) Patent No.: US 9,090,407 B2
(45) Date of Patent: Jul. 28, 2015

(54) STOPPING APPARATUS AND TEMPORARY STOPPING METHOD

(71) Applicant: HIRATA CORPORATION, Shinagawa-ku (JP)

(72) Inventors: Bungo Matsumoto, Shinagawa-ku (JP); Tetsunori Ohtaguro, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 0 days.

(21) Appl. No.: 14/490,710

(22) Filed: Sep. 19, 2014

(65) Prior Publication Data
US 2015/0001043 A1 Jan. 1, 2015

Related U.S. Application Data

(63) Continuation of application No. PCT/JP2012/002104, filed on Mar. 27, 2012.

(51) Int. Cl.
*B65G 47/24* (2006.01)
*B65G 47/29* (2006.01)
(Continued)

(52) U.S. Cl.
CPC ............... *B65G 47/29* (2013.01); *B65G 13/00* (2013.01); *B65G 43/00* (2013.01); *B65G 47/883* (2013.01); *B65G 47/8823* (2013.01)

(58) Field of Classification Search
CPC .. B65G 13/075; B65G 47/88; B65G 47/8815; B65G 47/8823; B65G 2205/06
USPC ................ 198/345.1, 459.6, 459.7; 193/35 A
See application file for complete search history.

(56) References Cited

U.S. PATENT DOCUMENTS 3,830,409 A    8/1974   Jenkinson
5,211,276 A    5/1993   Clopton
(Continued)

FOREIGN PATENT DOCUMENTS

EP    1522383 A2    4/2005
JP    59-156026 U   10/1984
(Continued)

OTHER PUBLICATIONS

International Search Report (PCT/ISA/210) mailed on Jun. 19, 2012, by the Japanese Patent Office as the International Searching Authority for International Application No. PCT/JP2012/002104.
(Continued)

*Primary Examiner* — James R Bidwell
(74) *Attorney, Agent, or Firm* — Buchanan Ingersoll & Rooney PC

(57) ABSTRACT

A stopping apparatus according to the invention includes a swing unit pivotal about a first pivot shaft between an abutment position in which the swing unit abuts against a work to stop conveyance of the work and a retreat position, a driving unit, and an elastic member applying a biasing force to the swing unit in a direction in which the swing unit is located at the abutment position. The swing unit includes a swing portion pivotal about the first pivot shaft and a movable portion including an abutment portion abutting against the work. The movable portion is pivotally connected to the swing portion. The movable portion pivots relative to the swing portion such that a distance between the first pivot shaft and the abutment portion becomes short along with a pivot motion of the swing unit to the retreat position.

7 Claims, 8 Drawing Sheets

(51) Int. Cl.
  *B65G 47/88* (2006.01)
  *B65G 13/00* (2006.01)
  *B65G 43/00* (2006.01)

(56) References Cited

U.S. PATENT DOCUMENTS

| | | |
|---|---|---|
| 5,676,235 A | 10/1997 | Sam et al. |
| 5,860,505 A | 1/1999 | Metzger |
| 5,911,297 A | 6/1999 | Unterhuber |
| 6,119,843 A | 9/2000 | Robinson |
| 6,164,430 A | 12/2000 | Nishimura |
| 6,220,418 B1 * | 4/2001 | Moradians ................. 193/35 A |
| 7,111,721 B1 | 9/2006 | Turner |
| 7,249,666 B1 | 7/2007 | Robinson |
| 7,380,649 B2 | 6/2008 | Lauyans |
| 7,484,615 B2 | 2/2009 | Miyamoto |
| 7,513,355 B2 | 4/2009 | Unterhuber |
| 7,565,960 B2 * | 7/2009 | Worner et al. ............. 198/459.6 |
| 7,938,246 B2 | 5/2011 | Lindemann et al. |
| 7,975,825 B2 | 7/2011 | Lindemann et al. |
| 8,376,122 B2 | 2/2013 | Matsumoto |
| 8,708,131 B2 | 4/2014 | Fukano et al. |
| 8,770,383 B2 * | 7/2014 | Matsumoto ................. 198/459.6 |
| 2008/0073180 A1 | 3/2008 | Unterhuber |
| 2009/0159393 A1 | 6/2009 | Lindemann et al. |

FOREIGN PATENT DOCUMENTS

| | | |
|---|---|---|
| JP | 63-094653 A | 4/1988 |
| JP | 5-86923 U | 11/1993 |
| JP | 6-16233 A | 1/1994 |
| JP | 07-157049 A | 6/1995 |
| JP | 8-319023 A | 12/1996 |
| JP | 10-017141 A | 1/1998 |
| JP | 11-227937 A | 8/1999 |
| JP | 2009-173417 A | 8/2009 |

OTHER PUBLICATIONS

Written Opinion (PCT/ISA/237) mailed on Jun. 19, 2012, by the Japanese Patent Office as the International Searching Authority for International Application No. PCT/JP2012/002104.

* cited by examiner

STOPPING APPARATUS AND TEMPORARY STOPPING METHOD

This application is a continuation of International Patent Application No. PCT/JP2012/002104 filed on Mar. 27, 2012, the entire content of which is incorporated herein by reference.

BACKGROUND OF THE INVENTION

1. Field of the Invention

The present invention relates to a stopping apparatus which abuts against a work being conveyed to stop the work.

2. Description of the Related Art

There is known a stopping apparatus for stopping, at a predetermined position, a work being conveyed on a conveying apparatus such as a roller conveyor (Japanese Patent Laid-Open Nos. 6-16233, 8-319023 and 11-227937). The stopping apparatus stops a work or cancels the stop of the work by moving an abutment portion such as a roller which abuts against the work onto a conveying apparatus or retreating it from the conveying apparatus. For this reason, a mechanism and actuator for moving the abutment portion are required.

As the mechanism for moving the abutment portion onto the conveying apparatus or retreating it from the conveying apparatus, a structure by which the abutment portion is reciprocally moved along a straight line and a structure by which the abutment portion is reciprocally moved by pivotal motion (this will be referred to as a pivot type hereinafter) are proposed. The pivot type can retreat the abutment portion with a smaller force than that of the structure by which the abutment portion is reciprocally moved along the straight line.

In the pivot type, a pivot shaft is often located on the upstream or downstream side of the abutment portion in a convey direction below a convey surface. In the structure in which the pivot shaft is located on the upstream side of the abutment portion, the pivot shaft is located in a region below the work which abuts against the abutment portion and is stopped. However, the region below the work is often used as a space in which an apparatus for lifting the stopped work or various sensors for confirming the stop of the work are disposed. For this reason, it is often difficult to ensure a space in which the stopping apparatus is disposed.

In the structure in which the pivot shaft is located on the downstream side of the abutment portion, when retreating the abutment portion to cancel the stop, the abutment portion draws an arcuate moving locus along which the abutment portion slightly moves toward the upstream side. For this reason, the work is slightly pushed back to the upstream side. An extra actuator output is required by this push-back force.

SUMMARY OF THE INVENTION

It is an object of the present invention to allow cancellation of stopping conveying a work being conveyed without pushing back the work to the upstream side.

According to an aspect of the present invention, there is provided a stopping apparatus for abutting against a work being conveyed to stop the work, comprising: a swing unit pivotal about a first pivot shaft downstream of a predetermined stop position in a convey direction of the work between an abutment position at which the swing unit abuts against the work being conveyed at the predetermined stop position to stop conveyance of the work and a retreat position which allows passage of the work; a driving unit configured to pivot the swing unit from the abutment position to the retreat position; and an elastic member configured to apply a biasing force to the swing unit in a direction to locate the swing unit at the abutment position, wherein the swing unit comprises: a swing portion pivotal about the first pivot shaft; and a movable portion including an abutment portion configured to abut against the work, the movable portion being pivotally connected to the swing portion through a second pivot shaft parallel to the first pivot shaft, and the movable portion pivoting in the predetermined direction relative to the swing portion such that a distance between the first pivot shaft and the abutment portion becomes short along with a pivot motion of the swing unit from the abutment position to the retreat position by the driving unit, and wherein when the work being conveyed abuts against the swing unit, the pivotal motion of the swing unit from the abutment position to the retreat position by an urging force from the work is regulated by a biasing force of the elastic member.

According to another aspect of the present invention, there is provided a temporary stopping method in which a stopping apparatus abuts against a work being conveyed to stop the work and then cancels the stop of the work, the stopping apparatus comprising: a swing unit pivotal about a first pivot shaft downstream of a predetermined stop position in a convey direction of the work between an abutment position at which the swing unit abuts against the work being conveyed at the predetermined stop position to stop conveyance of the work and a retreat position which allows passage of the work; a driving unit configured to pivot the swing unit from the abutment position to the retreat position; and an elastic member configured to apply a biasing force to the swing unit in a direction to locate the swing unit at the abutment position, wherein the swing unit comprises: a swing portion pivotal about the first pivot shaft; and a movable portion including an abutment portion configured to abut against the work and pivotally connected to the swing portion through a second pivot shaft parallel to the first pivot shaft, the temporary stopping method comprising: a stopping step of causing the swing unit positioned at the abutment position by a biasing force of the elastic member to abut against the work being conveyed to stop the work and regulating, by the biasing force of the elastic member, a pivotal motion of the swing unit from the abutment position to the retreat position by an urging force from the work; and a stop canceling step of causing the driving unit to pivot the swing unit from the abutment position to the retreat position and pivoting the movable portion in the predetermined direction relative to the swing portion along with the pivotal motion of the swing unit such that a distance between the first pivot shaft and the abutment portion becomes short.

Further features of the present invention will become apparent from the following description of exemplary embodiments (with reference to the attached drawings).

DESCRIPTION OF THE EMBODIMENTS

<First Embodiment>

Figure 1:
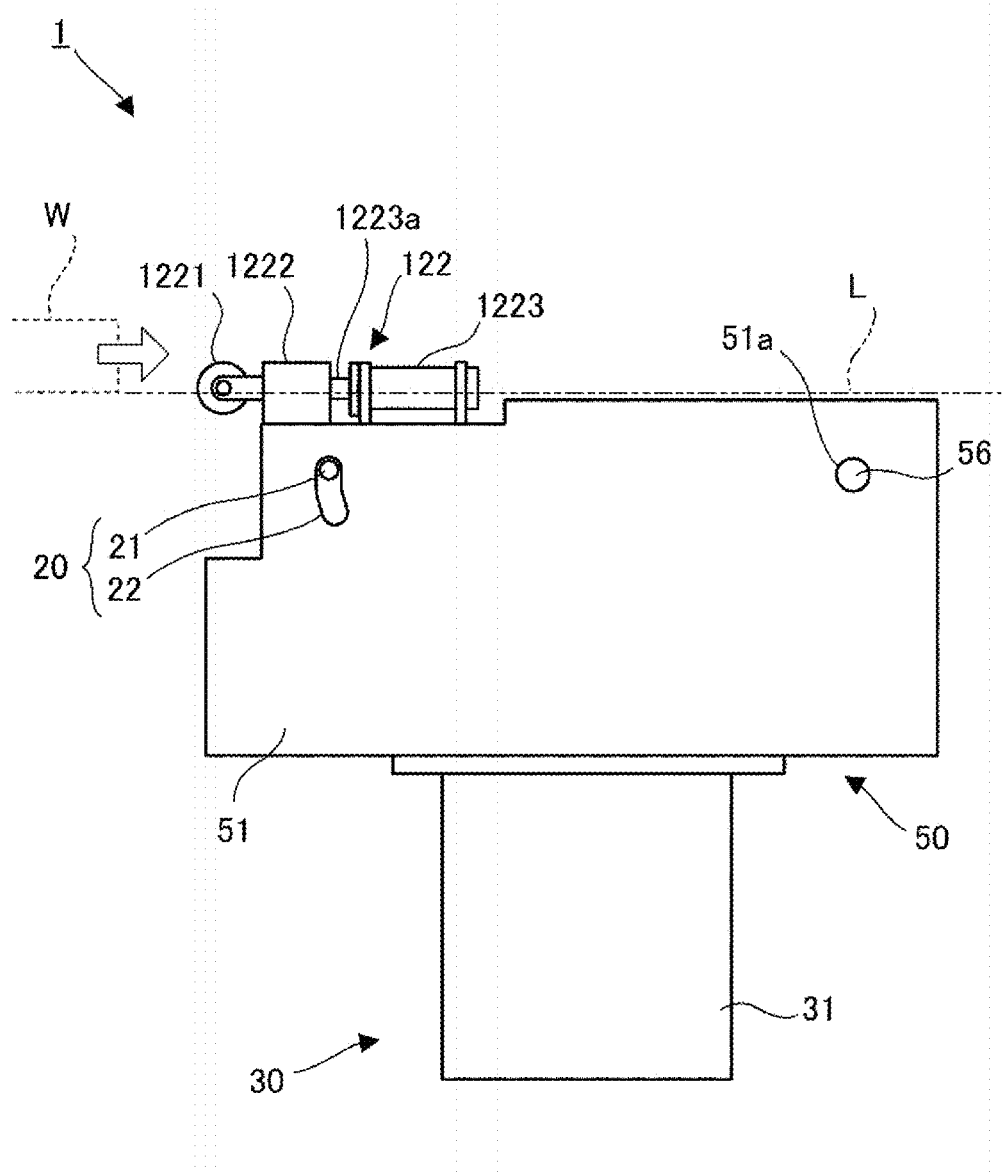
FIG. 1 is a view showing the outer appearance of a stopping apparatus according to an embodiment of the present invention.
Figure 2:
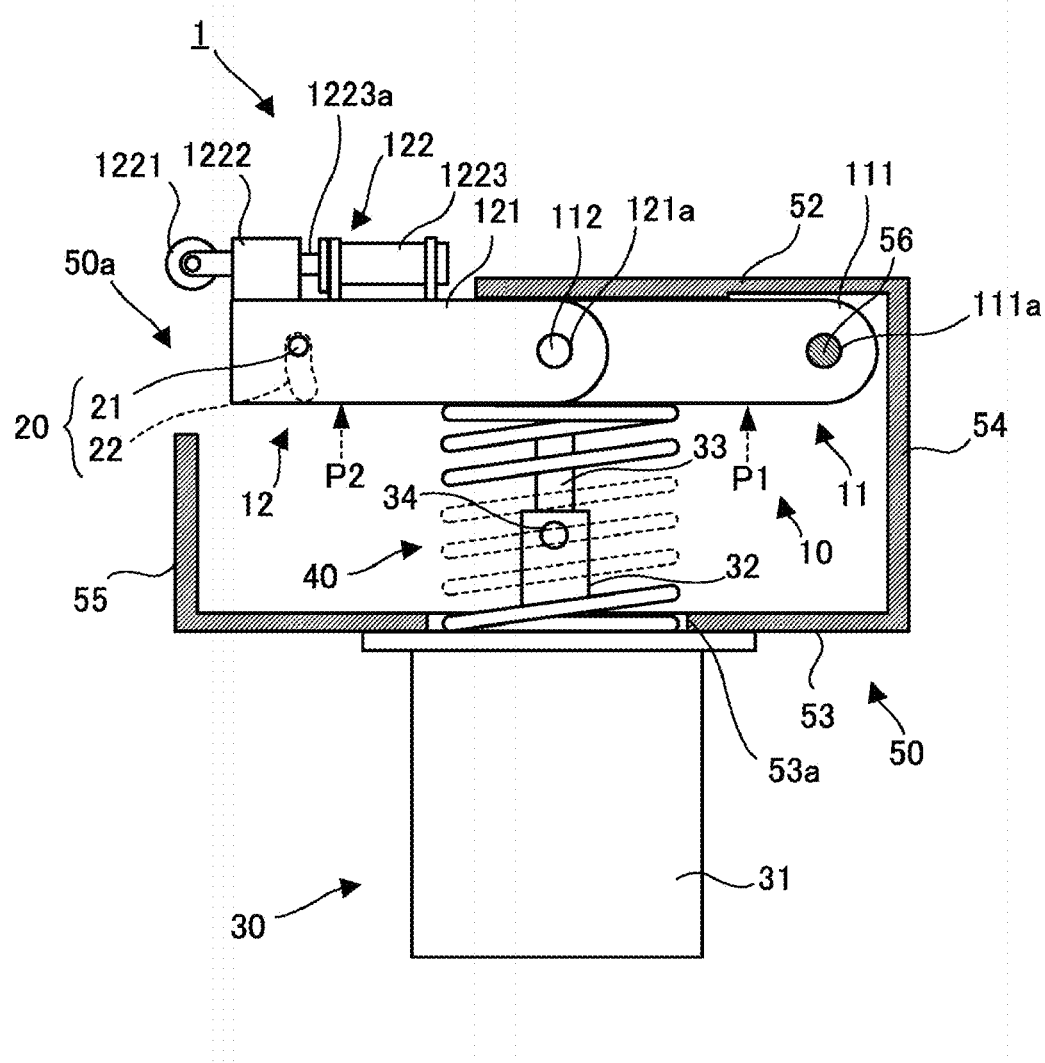
FIG. 2 is a view for explaining the internal structure of the stopping apparatus shown in FIG. 1.
Figure 3:
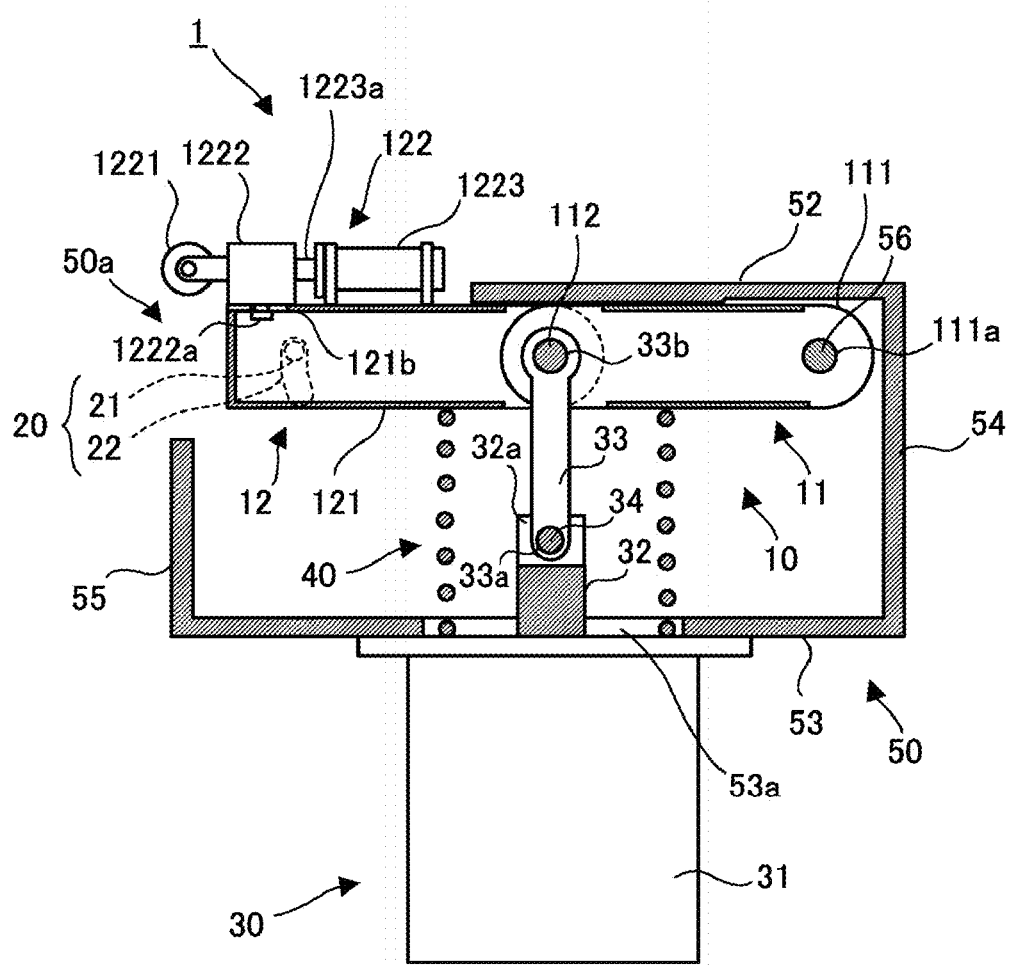
FIG. 3 is a view for explaining the internal structure of the stopping apparatus shown in FIG. 1.

A stopping apparatus 1 according to an embodiment of the present invention will be described with reference to FIGS. 1 to 3. FIG. 1 is a view showing the outer appearance of the stopping apparatus 1. FIGS. 2 and 3 are views for explaining the internal structure of the stopping apparatus 1. FIG. 2 is a view by removing a side wall portion 51 in FIG. 1. FIG. 3 is a sectional view obtained by partially cutting away a swing unit 10 and the driving unit 30 in FIG. 2.

The stopping apparatus 1 is an apparatus which abuts against a work W being conveyed to stop conveyance of the work. The stopping apparatus 1 includes the swing unit 10, a guide mechanism 20, a driving unit 30, and a support member 50 as the main components. The stopping apparatus 1 is arranged in a conveying apparatus such as a roller conveyor and used to temporarily stop the work being conveyed on the conveying apparatus. An alternate long and two short-dashed line L in FIG. 1 indicates a convey surface. The convey surface is a position (height) at which the work is placed and conveyed in a conveying apparatus (not shown). The work W is conveyed from the left to the right, as indicated by an arrow in FIG. 1.

<Swing Unit 10>

The swing unit 10 includes a swing portion 11 and a movable portion 12 and is pivotal about a pivot shaft 56.

The swing portion 11 includes a swing member 111 extending in the horizontal orientation. The swing member 111 has a square cylindrical body with two open end portions. The swing member 111 has an axial hole 111a at its one end portion. The pivot shaft 56 is inserted into the axial hole 111a, and the swing member 111 is pivotal about the pivot shaft 56. The swing member 111 has an axial hole (not shown), at the other end portion, into which a pivot shaft 112 is inserted.

The movable portion 12 is connected to the swing portion 11 through the pivot shaft 112. The movable portion 12 is pivotal about the pivot shaft 112. The movable portion 12 is pivotal relative to the swing portion 11. The pivot shaft 56 is parallel to the pivot shaft 112. The pivot shaft 112 is located upstream of the pivot shaft 54 in the convey direction of the work W (the direction indicated by the arrow in FIG. 1). The pivot shafts 56 and 112 are located below a convey surface L.

The movable portion 12 includes a movable member 121 and an abutment unit 122. The movable portion 121 has a square cylindrical body with one open end portion. The other end portion of the swing member 111 is inserted into the one end portion of the movable member 121 and has an axial hole 121a. The pivot shaft 112 is inserted into the axial hole 121a. As described above, the movable portion 12 is connected to the swing portion 11 through the pivot shaft 112.

The abutment unit 122 is mounted on the movable member 121. The abutment unit 122 includes a roller 1221 serving as a work abutment portion which abuts against the work and a support member 1222 which rotatably supports the roller 1221. A groove portion 121b extending in the convey direction is formed in the upper wall of the movable member 121. The support member 1222 includes an engaging portion 1222a which engages with the groove portion 121b. The support member 1222 is slidable by the guide of the groove portion 121b with respect to the movable member 121 in the convey direction.

A shock absorber 1223 is supported by the movable member 121. The rear end portion of the support member 1222 abuts against the distal end of a rod portion 1223a of the shock absorber 1223. The sliding impact of the support member 1222 in the convey direction is relaxed.

<Support Member 50>

The support member 50 includes the pair of side wall portions 51. The pair of side wall portions 51 are connected by an upper wall portion 52, a bottom wall portion 53, a rear end wall portion 54, and a front end wall portion 55. The front end wall portion 55 and the upper wall portion 52 of the support member 50 are partially notched to form an open portion 50a.

The side wall portions 51 include bearing holes 51a, respectively, for supporting the pivot shaft 56. The swing member 111 is disposed between the side wall portions 51, and at the same time the bearing holes 51a are aligned with the axial hole 111a. The pivot hole 56 is inserted into the bearing holes 51a and the axial hole 111a. This makes it possible to allow the support member 50 to support the entire swing unit 10 such that the entire swing unit 10 is pivotal about the pivot shaft 56.

<Guide Mechanism 20>

The guide mechanism 20 is a regulating mechanism which regulates a moving range so as to guide the pivotal motion of the movable portion 12 about the pivot shaft 112 when pivoting the swing unit 10 from the abutment position to the retreat position. Providing the guide mechanism 20 makes it possible to move the movable portion 12 along an intended locus when pivoting the swing unit 10 about the pivot shaft 56.

In this embodiment, the guide mechanism 20 includes a pin 21 and a guide groove 22. The pin 21 is fixed to one side surface portion of the movable member 121 to form a portion protruding from the one side surface portion of the movable member 121. The guide groove 22 is formed in one of the pair of wall portions 51.

The end portion of the pin 21 is engaged with the guide groove 22 to allow the guide groove 22 to guide the movable portion 12. Note that in this embodiment, the pin 21 serves as an engaging portion on the movable portion 12 side, while the guide groove 22 serves as an immobile engaging portion on the side wall portion 51 side. The layout positions of the pin and the guide groove may be reversed.

The upper portion of the guide groove 22 extends vertically, and the guide groove 22 extends obliquely downward on the downstream portion of the convey direction. The lower portion of the guide groove 22 extends more obliquely than its upper portion in the downstream side. In other words, the guide groove 22 is formed in a V shape moderately bending toward the downstream side of the convey direction. For this reason, when the swing portion 11 of the swing unit 10 is pivoted counterclockwise about the pivot shaft 56, the movable portion 12 moves downward almost straight in its initial state slightly in the downstream side of the convey direction. After that, the movable portion 12 further moves downward on the downstream side of the convey direction. The moving orientation of the movable portion 12 is determined by the groove shape (bending shape) of the guide groove 22.

<Driving Unit 30>

The driving unit 30 generates a driving force to pivot the swing unit 10 about the pivot shaft 56. The driving unit 30 includes a motored driving portion 31, a plunger 32 moved by the driving portion 31, and a connecting member 33. The driving portion 31 is fixed to the bottom wall portion 53. The plunger 32 and the connecting member 33 enter the support member 50 through an opening portion 53a formed in the bottom wall portion 53.

In this embodiment, the driving portion 31 and the plunger 32 constitute a pull solenoid. Upon energization of the cylindrical driving portion 31 (electromagnet), a driving force acts in only the direction (downward) in which the plunger 32 is drawn into the cylinder of the driving portion 31. That is, the pull solenoid does not generate a driving force in a direction (upward) to pull out the plunger 32 from the cylinder of the driving portion 31. In this embodiment, the pull solenoid is employed, but any other electrically driven actuator such as a motor may be used. Note the same effect as described above can be obtained even if a known actuator except an electrically driven actuator (for example, an air cylinder) may be used in place of the electrically driven actuator. Use of the pull solenoid can make it possible to obtain a compact apparatus.

A slit (recess) 32a which receives and engages with one end portion (lower end portion) of the connecting member 33 is formed at the upper end portion of the plunger 32. A pin 34 is disposed in the slit 32a. A connecting hole 33a which receives the pin 34 is formed at the lower end portion of the connecting member 33. The plunger 32 and the connecting member 33 are connected through the pin 34. The connecting member 33 is pivotal about the pin 34 with respect to the plunger 32.

The other end portion (upper end portion) of the connecting member 33 is inserted inside the swing member 111 and the movable member 121. A connecting hole 33b which receives the pivot shaft 112 is formed in the other end portion of the connecting member 33. The swing unit 10 and the connecting member 33 are connected through the pivot shaft 112. The connecting member 33 is pivotal about the pivot shaft 112.

In this embodiment, the connecting position between the driving unit 30 and the swing unit 10 is defined as the pivot shaft 112. The present invention is not limited to this. For example, an arbitrary position of the swing portion 11 is defined as the connecting position.

(Elastic Member 40)

The elastic member 40 applies a biasing force to the swing unit 10 in a direction to position the swing unit 10 at the abutment position (the position shown in each of FIGS. 1 to 3). In this embodiment, the elastic member 40 comprises a push spring (coil spring) and always biases the swing unit 10 upward. The elastic member 33 is not limited to the coil spring, but can employ another elastic member such as a leaf spring in addition to the push spring.

In this embodiment, when viewed from the urging central point, the elastic member 40 is disposed to bias the connecting portion (pivot shaft 112) between the swing portion 11 and the movable portion 12. More specifically, the elastic member 40 is loaded between the swing unit 10 and the driving portion 31. At the same time, the plunger 32 and the connecting member 33 are inserted into the elastic member 40.

As in this embodiment, when the elastic member 40 is arranged to bias the connecting portion between the swing portion 11 and the movable portion 12, the counterclockwise pivotal motion of the entire swing unit 10 about the pivot shaft 56 can be effectively prevented.

The biasing position of the elastic member 40 is not limited to the connecting portion between the swing portion 11 and the movable portion 12. This biasing position may be the intermediate portion (for example, a position P1 in FIG. 2) of the swing portion 11 or the intermediate portion (for example, a position P2 in FIG. 2) of the movable portion 12. If the biasing position is the intermediate portion of the movable portion 12, an elastic member having a small biasing force can be employed as the elastic member 40 to prevent counterclockwise pivotal motion of the entire swing unit 10. However, the counterclockwise pivotal motion prevention effect of the movable portion 12 with respect to the swing portion 11 may often be poor. If the biasing position is the intermediate portion of the swing portion 11, an elastic member having a large biasing force is required as the elastic member 40. Therefore, an optimal biasing position is the connecting portion between the swing portion 11 and the movable portion 12.

<Operation Example of Stopping Apparatus 1>

Figure 4:
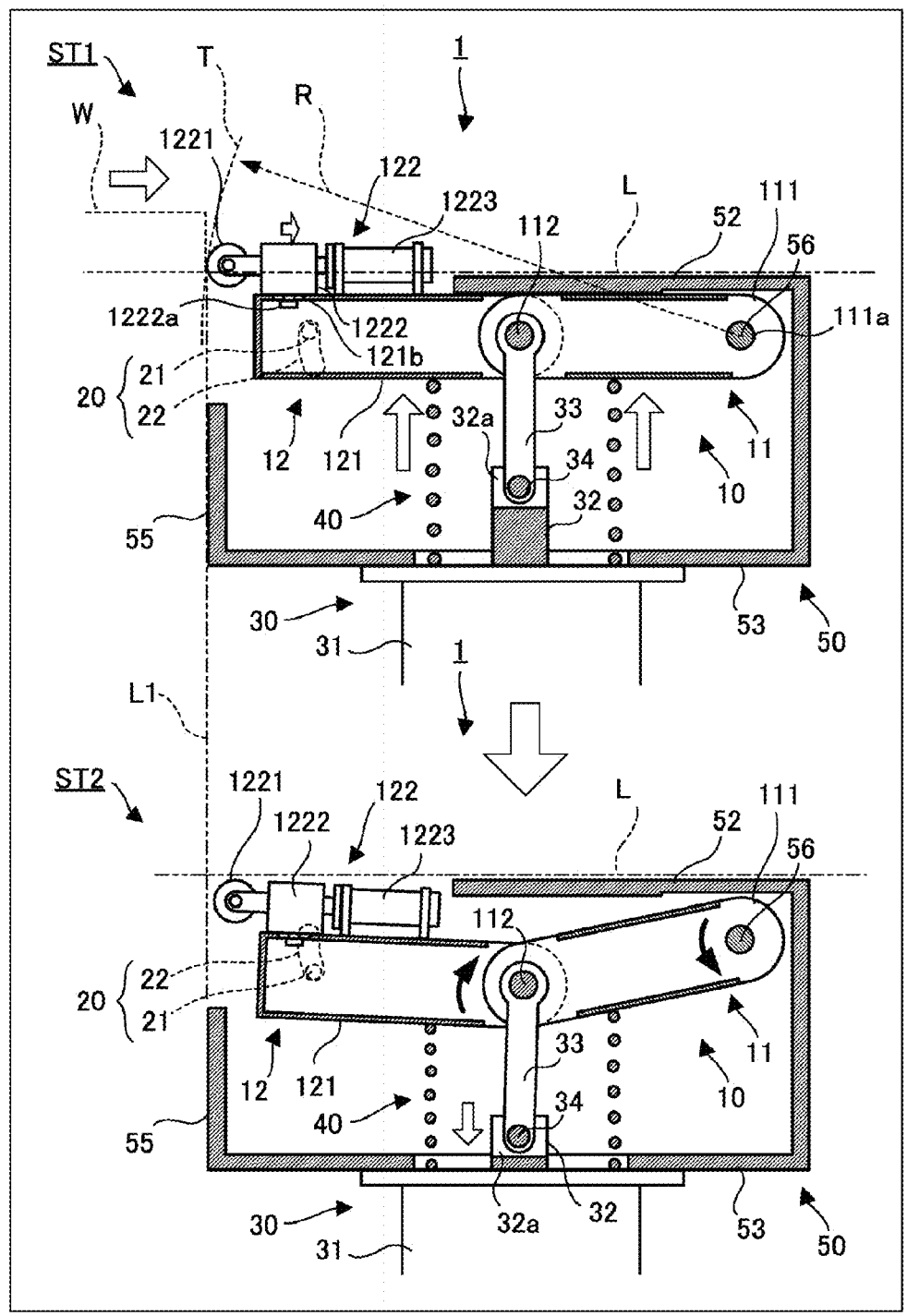
FIG. 4 is a view for explaining the operation of the stopping apparatus shown in FIG. 1.

An operation example of the stopping apparatus 1 will be described next with reference to FIG. 4. A state ST1 in FIG. 4 is a state (as in the state of each of FIGS. 1 to 3) in which the swing unit 10 is located at the abutment position. A state ST2 in FIG. 4 is a state in which the swing unit 10 is located at the retreat position. The abutment position indicated by the state ST1 is a position where the stopping apparatus 1 abuts against the work W being conveyed at a predetermined stop position, thereby stopping conveyance of the work W. For this reason, the roller 1221 protrudes above the lower surface of the work W, that is, the convey surface L. At this time, the driving portion 31 is set in a non-driving state.

The retreat position indicated by the state ST2 is a position which allows passage of the work W. The entire swing unit 10 pivots counterclockwise about the pivot shaft 56. The movable portion 12 pivots clockwise about the pivot shaft 112 relative to the swing portion 11. An operation for temporarily stopping the work W will be described below.

The state ST1 is a state in which the work W conveyed from the left to the right in the horizontal orientation in FIG. 4 abuts against the roller 1221 and is stopped at the predetermined stop position. In this embodiment, the support member 1222 which supports the roller 1221 is slidable in the convey direction with respect to the movable member 121. When the work W abuts against the roller 1221, the support member 1222 moves in the convey direction. However, since the support member 1222 starts abutting against the distal end of the rod portion 1223a of the shock absorber 1223, the shock absorber 1223 relaxes the collision impact between the work W and the roller 1221.

Assume that the work W abuts against the roller 1221. In this case, when the swing unit 10 pivots from the abutment position to the retreat position by the urging force of the work W, the work W cannot be stopped. In this embodiment, the elastic member 40 regulates the pivotal motion of the swing unit 10 from the abutment position to the retreat position. That is, the elastic member 40 applies the biasing force to the swing unit 10 in a direction to locate the swing unit 10 at the abutment position. When an elastic member having a larger elastic force (biasing force) than the urging force of the work W is selected as the elastic member 40, the swing unit 10 can be prevented from pivoting from the abutment position to the retreat position. This makes it possible to stop the work W (stopping step).

Note that the clockwise pivotal motion of the entire swing unit 10 about the pivot shaft 56 by the urging force of the work W and the counterclockwise pivotal motion of the movable portion 12 about the pivot shaft 112 relative to the swing portion 11 by the urging force of the work W must also be prevented. In this embodiment, the upper wall portion 52 functions as a regulating portion which regulates such operations. That is, the upper wall portion 52 abuts against the upper surfaces of the swing portion 11 and the movable portion 12, thereby preventing the pivotal motion of the entire swing unit 10 in a direction opposite to the pivotal direction from the abutment position to the retreat position and the pivotal motion of the movable portion 12 in a direction opposite to the pivotal direction from the abutment position to the retreat position relative to the swing portion 11.

An operation for restarting conveyance of the work W (allowing passage of the work W) as indicated by the state ST2 after the work W is stopped as indicated by the state ST1 (stop canceling step) will be described below. In this case, when the driving portion 31 is driven to move the plunger 32 downward and move the connecting member 33 connected to the plunger 32 downward through the pivot shaft 112, the swing unit 10 is pivoted counterclockwise about the pivot shaft 56 against the biasing force of the elastic member 40.

In this embodiment, the pivot shaft 56 about which the swing unit 10 pivots is located on the downstream side of the stop position of the work W in the convey direction. For this reason, even if the pivot unit 10 does not have the pivot shaft 112 and the movable portion 12 does not pivot with respect to the swing portion 11, the abutment point of the roller 1221 with respect to the work W moves along an arcuate locus T described in the state ST1 of FIG. 4. The arcuate locus T is a virtual arc having, as a radius, the distance between the axis of the pivot shaft 54 and the abutment point of the roller 1221 with respect to the work W.

When the abutment point of the roller 1221 with respect to the work W moves along the arcuate locus T, the roller 1221 (stopping apparatus 1) pushes back the work W slightly toward the upstream side when the roller 1221 moves (pivots counterclockwise) from the contact position at which the work W and the roller 1221 contact each other to the retreat position at which the work W and the roller 1221 do not contact each other. An extra output of the driving portion 31 is required by this push-back force in addition to a force for driving the plunger 32 of the driving portion 31 downward. In this embodiment, the movable portion 12 pivots with respect to the swing portion 11, thereby solving the above problem.

More specifically, when the plunger 32 moves downward, the swing unit 10 pivots counterclockwise (downward) as a whole while being bent to a side opposite to the moving direction of the plunger 32 against the biasing force of the elastic member 40. The abutment unit 12 starts moving downward to the retreat position. When the abutment unit 12 reaches the retreat position as indicated by the state ST2, the stop of the work W is canceled.

When the swing unit 10 pivots to the retreat position, the movable portion 12 pivots with respect to the swing portion 11. The swing unit 10 is bent at its intermediate portion (pivot shaft 112). The guide mechanism 20 guides the pivotal motion of the movable portion 12 about the pivot shaft 112. The movable portion 12 pivots clockwise (upward) with respect to the swing portion 11. As a result, along with the pivotal motion of the swing unit 10 from the abutment position to the retreat position, the straight distance between the pivot shaft 56 and the roller 1221 is shortened. The abutment point between the roller 1221 and the work W moves inside the arcuate locus T indicated by the state ST1 in FIG. 4. Referring to FIG. 4, an alternate long and two-short dashed line L1 indicates the position of the abutment point between the work W and the roller 1221 when the work W is stopped.

More specifically, when the swing portion 11 starts rotating counterclockwise about the pivot shaft 56, the pivot shaft 112 and the swing portion 11 move together.

The upper portion of the guide groove 22 extends in the vertical orientation, the guide groove 22 is slightly inclined downstream in the convey direction, and horizontal movement of the movable member 121 to the right in FIG. 4 is basically regulated through the pin 21. For this reason, the movable member 121 moves downward obliquely along the guide groove 22 and rotates clockwise about the pin 21.

As a result, the roller 1221 moves downward while moving clockwise about the pin 21. That is, the roller 1221 moves to the downstream side of the convey direction, that is, downward (lower right direction in FIG. 4).

Note that an upward moving distance upon clockwise movement of the roller 1221 may be temporarily larger than a downward moving distance of the movable member 121 depending on the length of the swing member 111 of the swing portion 11, the distance between the pivot shaft 112 and the pin 21, the distance between the roller 1221 and the pin 21, and the like.

However, in this case, the roller 1221 continuously moves downward in the convey direction. For this reason, the abutment point between the roller 1221 and the work W moves inside the arcuate locus T. The distance between the pivot shaft 54 and the abutment point between the roller 1221 and the work W becomes short.

The lower portion of the guide groove 22 extends obliquely toward the downstream side of the convey direction. This makes it possible to guide the movable member 121 toward the downstream side of the convey direction through the pin 21. For this reason, downward movement toward the downstream side of the convey direction of the roller 1221 is further promoted. A combination of two movements (that is, guide (horizontal movement) toward the downstream side of the convey direction and the downward movement) makes it possible to more smoothly move the roller 1221 to the retreat position.

As described above, in this embodiment, when pivoting the swing unit 10 from the abutment position to the retreat position, the movable portion 12 moves downward while moving downstream in the convey direction. The movable portion 12 will not move in a direction to push back the work W upstream. That is, when pivoting the swing unit 10 from the abutment position to the retreat position, the force for pushing back the work W upstream need not be added to the pivotal force.

For this reason, a lower-output driving portion 31 actuator can be employed as the actuator (driving portion 31) of the stopping apparatus 1.

The shape of the guide groove 22 is arbitrary as long as the abutment point between the roller 1221 and the work W moves inside the arcuate locus T and the roller 1221 can be moved so that the distance between the pivot shaft 56 and the abutment point becomes short.

When the driving portion 31 is set in a non-driving state from the state ST2 in FIG. 4, the swing portion 11 and the movable portion 12 return to the state ST1 by the restoration force of the elastic member 40.

<Second Embodiment>

In the first embodiment described above, the part (upper wall portion 52) of the support member 50 is used as the regulating portion for regulating the pivotal motion of the movable portion 12 in a direction (counterclockwise) opposite to the predetermined direction (clockwise) relative to the swing portion 11. However, a regulating portion may be provided to the movable portion 12 or the swing portion 11.

Figure 5:
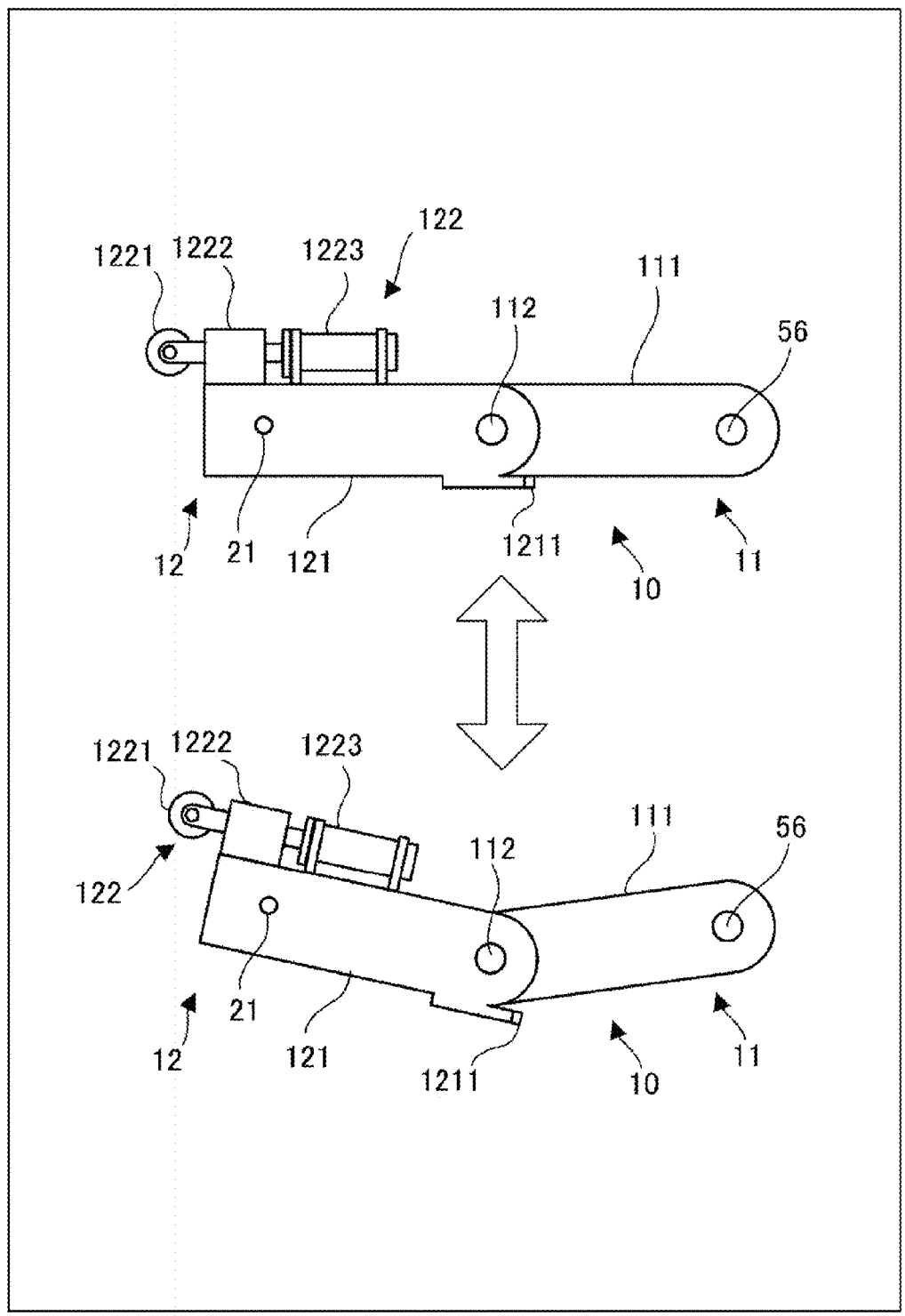
FIG. 5 is a view for explaining another example of a regulating portion.

FIG. 5 shows an example of the above arrangement and exemplifies a case in which a regulating portion 1211 is provided in a movable member 121. The regulating portion 1211 extends parallel to a pivot shaft 112. The regulating portion 1211 abuts against the lower surface of a swing member 111 to regulate the pivotal motion of a movable portion 12 in an opposite direction (counterclockwise) with respect to a swing portion 11. The regulating portion 1211 allows the pivotal motion of the movable portion 12 in a predetermined direction (clockwise). This makes it possible to prevent the movable portion 12 from pivoting in a direction opposite to the intended direction.

<Third Embodiment>

Figure 6:
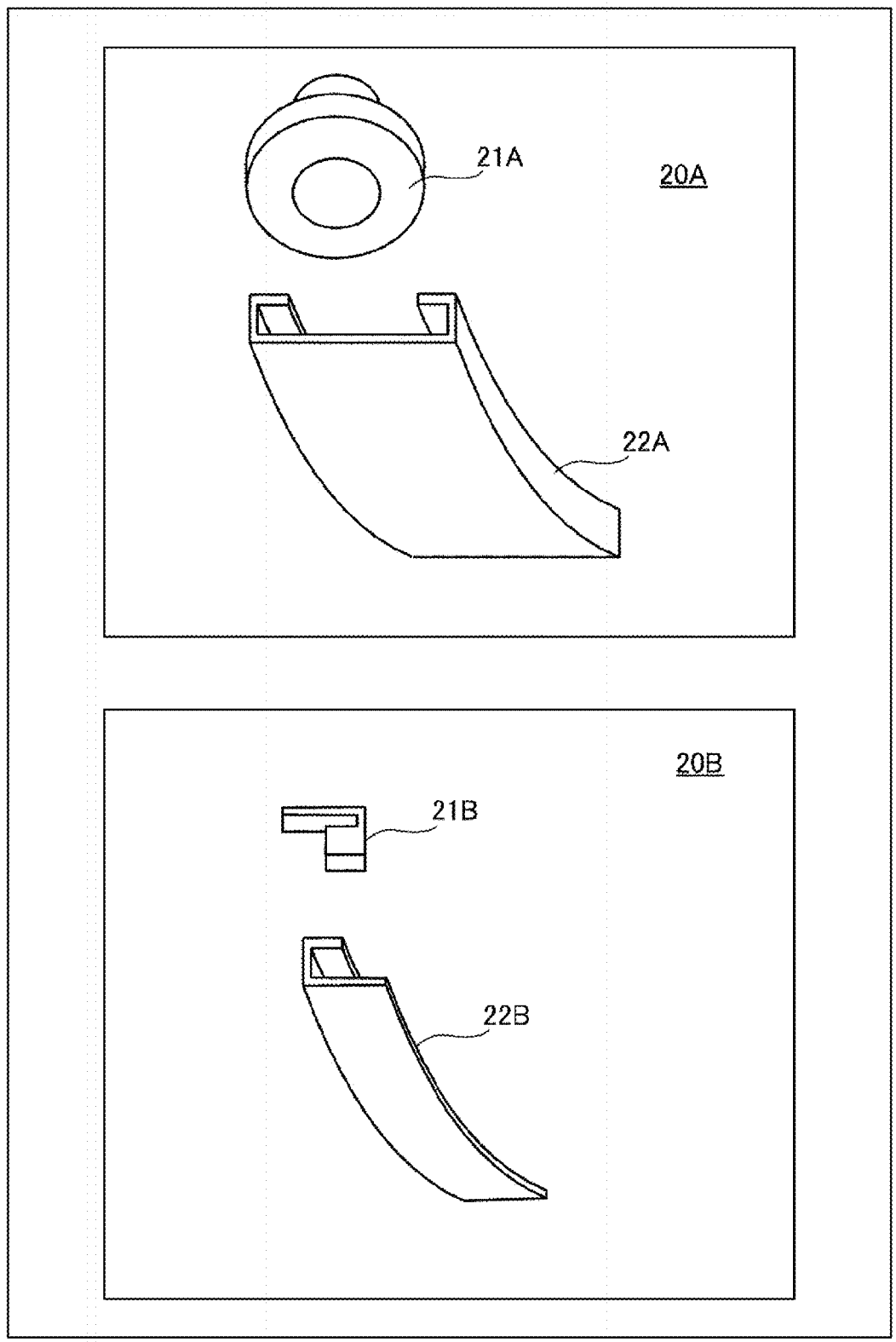
FIG. 6 is a view for explaining another example of a guide mechanism.

The first embodiment has exemplified that the guide mechanism 20 is formed from the pin 21 and the guide groove 22. The arrangement of the guide mechanism 20 is not limited to this. FIG. 6 shows two other examples of the guide mechanism 20.

A regulating mechanism 20A is designed such that a roller 21A serves as an engaging portion on the side of a movable portion 12, and a rail member 22A serves as an immobile engaging portion on the side of a wall portion 51. The roller 21A is swingable in the rail member 22A. The pivotal motion of the movable portion 12 can be guided in conformity with the rail shape of the rail member 22A. Note that the roller 21A may serve as an immobile engaging portion on the side of the wall portion 51, and the rail member 22A may serve as an engaging portion on the side of the movable portion 12.

A regulating mechanism 20B is designed such that a slide member 21B serves as an engaging portion on the side of the movable portion 12, and a rail member 22B serves as an immobile engaging portion on the side of the wall portion 51. The slide member 21B is slidable in the rail member 22B, and the pivotal motion of the movable portion 12 can be guided in conformity with the rail shape of the rail member 22A. Note that the slide member 21B may serve as an immobile engaging portion on the side of the wall portion 51, and the rail member 22B may serve as an engaging portion on the side of the movable portion 12.

<Fourth Embodiment>

Figure 7:
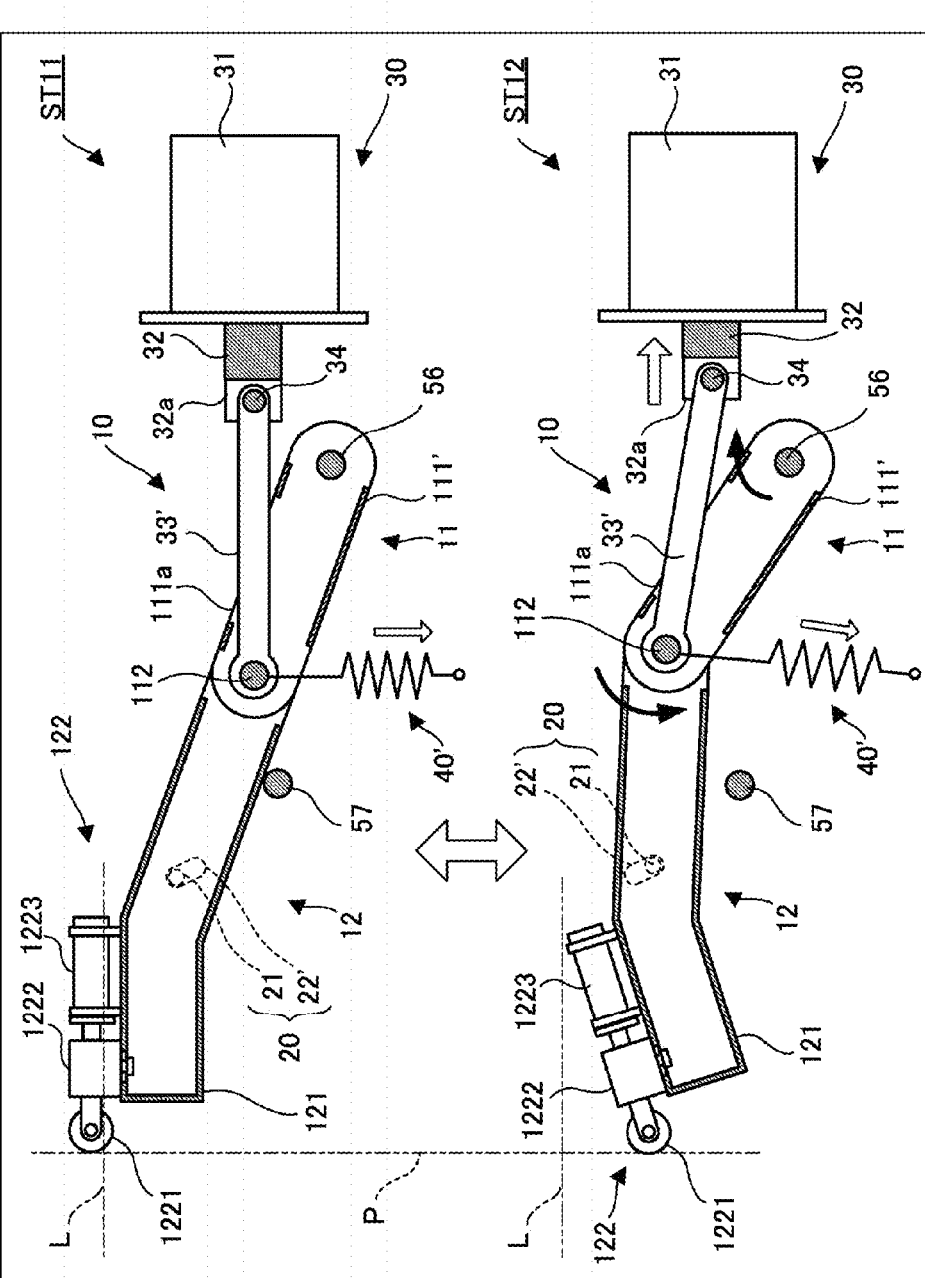
FIG. 7 is a view for explaining another layout example of a driving unit.

In the first embodiment, the moving direction of the plunger 32 is a direction perpendicular to the convey direction, but may be parallel to the convey direction. In addition, the bending direction of the swing portion 11 and the movable portion 12 need not be limited to that in the first embodiment. FIG. 7 is a view showing another layout of a driving unit 30. The same reference numerals as in the first embodiment denote the same arrangements, and a description thereof will be omitted. A state ST11 indicates a case in which a swing unit 10 is located at an abutment position, and state ST12 indicates a case in which the swing unit 10 is located at a retreat position.

In the example shown in FIG. 7, the driving unit 30 is arranged downstream of the swing unit 10 in the convey direction. A plunger 32 is movable in a direction parallel to the convey direction. A connecting member 33' in place of the connecting member 33 of the first embodiment is longer than the connecting member 33 and extends in the convey direction. A swing member 111' in place of the swing member 111 of the first embodiment has an opening portion 111a to prevent interference with the connecting member 33'.

An elastic member 40' in place of the elastic member 40 of the first embodiment is made from a tension spring in the fourth embodiment. The elastic member 40' always biases a pivot shaft 121 downward. The structure of a guide mechanism 20 is basically the same as that of the first embodiment. However, the shape of a guide groove 22' is suitable for the fourth embodiment. A regulating portion 57 is fixed to a support member 50 (not shown in FIG. 7) and regulates the pivotal motion of the movable portion 12 in a non-intended direction with respect to the swing unit 10 and the swing portion 11.

In the state ST11, a work W abuts against a roller 1221 to stop conveyance of the work. At this time, the biasing force of the elastic member 40' can prevent the pivotal motion of the swing unit 10 from the abutment position to the retreat position by the urging force from the work W. The regulating portion 57 regulates the pivotal motion of the movable portion 12 in the non-intended direction with respect to the swing unit 10 and the swing portion 11.

To cancel the stop, as indicated by the state ST12, the driving portion 31 is driven to draw the plunger 32 into a driving portion 31, thereby pivoting the swing unit 10 against the biasing force of the elastic member 40'. At this time, the pivotal direction is different from that of the first embodiment. The swing unit 10 (swing member 111') is pivoted clockwise about the pivot shaft 56. The pivotal direction of the movable portion 12 with respect to the swing portion 11 is also different from that in the first embodiment. The movable portion 12 is pivoted counterclockwise about the pivot shaft 112. The swing portion 11 and movable portion 12 are bend in a convex shape (inverted V shape), which is different from the concave shape (V shape) of the first embodiment.

In this embodiment as well, when pivoting the swing unit 10 from the abutment position to the retreat position, the distance between the pivot shaft 56 and the abutment point between the roller 1221 and the work W becomes short. The work W need not be pushed back to the upstream side.

<Fifth Embodiment>

Figure 8:
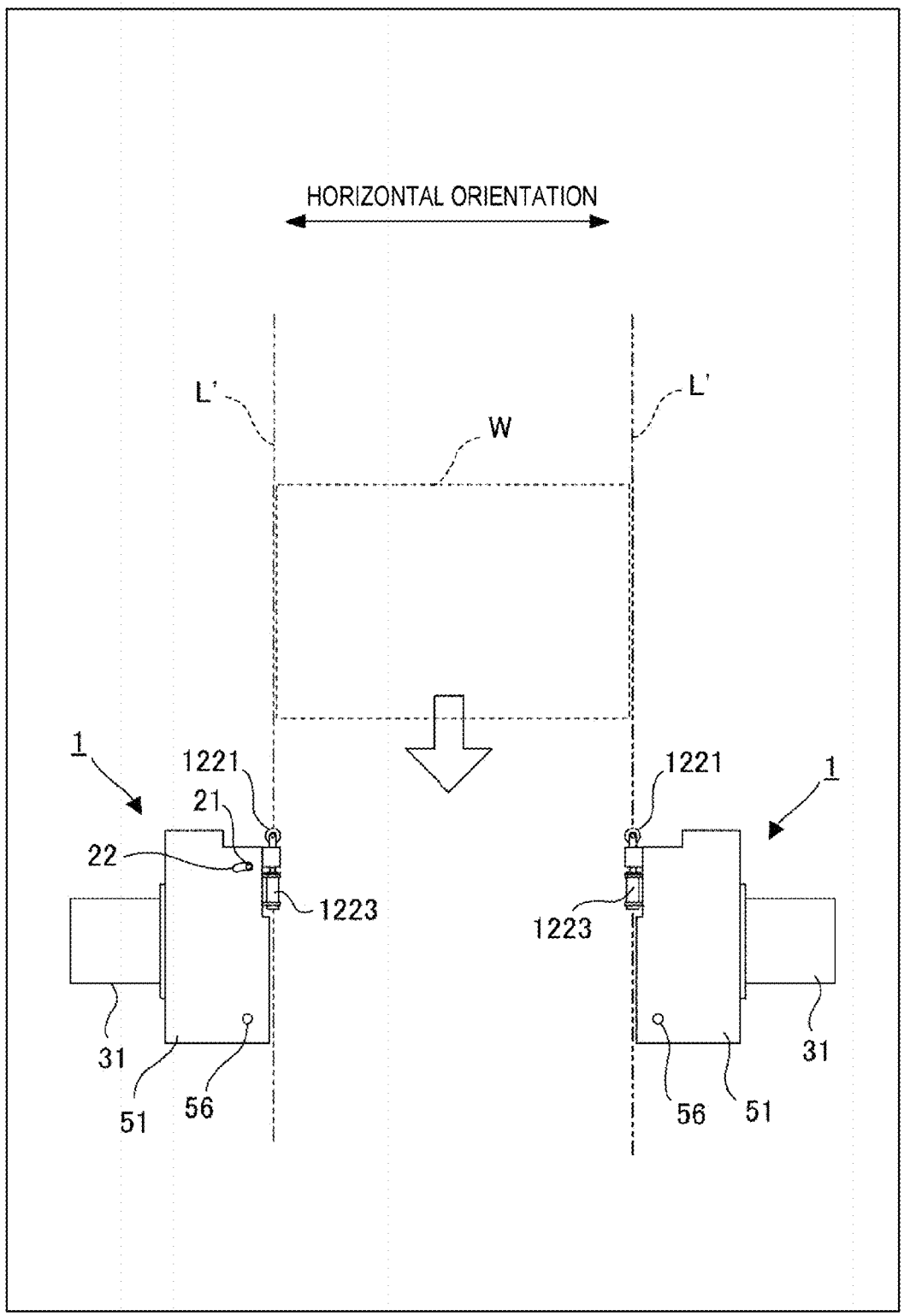
FIG. 8 is a view for explaining another layout example of the stopping apparatus 1 shown in FIG. 1.

The first and second embodiments exemplify cases in which the stopping apparatuses 1 are located on the lower side of the convey locus of the work W. However, the layout positions of the stopping apparatuses 1 need not be limited to these. For example, stopping apparatuses may be positioned on the upper side of the convey locus of the work W or may be positioned on the sides of the convey locus. In either case, the effects of the first and second embodiments can be obtained. FIG. 8 shows a case in which stopping apparatuses 1 are located on the sides of the convey locus of a work W.

In the example of FIG. 8, the pair of stopping apparatuses 1 are located to be spaced apart from each other in the horizontal orientation. In other words, the pair of stopping apparatuses 1 in FIG. 1 are fallen sideways and are disposed to face each other at the same level as a convey surface L'-L'. The stopping apparatuses 1 are disposed so that the axial directions of the pivot shafts 56 face the vertical orientation. The convey surface L' is the position where the right and left portions of the work W pass, out of the convey locus of the work W. In the structure shown in FIG. 8, each swing unit 10 swings on the horizontal surface about the corresponding pivot shaft 56. At the abutment position, each abutment surface 1221 protrudes inside the region of the convey surface L'-L'. The abutment surface 1221 falls outside the region of the convey surface L'-L' at the retreat position.

<Other Embodiments>

The present invention is not limited to the above embodiments. Various changes and modification can be made without departing from the spirit and scope of the present invention. Therefore, to apprise the public of the scope of the present invention, the following claims are made.

What is claimed is:

1. A stopping apparatus for abutting against a work being conveyed to stop the work, comprising:
   a swing unit pivotal about a first pivot shaft downstream of a predetermined stop position in a convey direction of the work between an abutment position at which said swing unit abuts against the work being conveyed at the predetermined stop position to stop conveyance of the work and a retreat position which allows passage of the work;

a driving unit configured to pivot said swing unit from the abutment position to the retreat position; and an elastic member configured to apply a biasing force to said swing unit in a direction to locate said swing unit at the abutment position, wherein said swing unit comprises:

a swing portion pivotal about the first pivot shaft; and a movable portion including an abutment portion configured to abut against the work, said movable portion being pivotally connected to said swing portion through a second pivot shaft parallel to the first pivot shaft, and said movable portion pivoting in the predetermined direction relative to said swing portion such that a distance between the first pivot shaft and the abutment portion becomes short along with a pivot motion of said swing unit from the abutment position to the retreat position by said driving unit, and wherein when the work being conveyed abuts against said swing unit, the pivotal motion of said swing unit from the abutment position to the retreat position by an urging force from the work is regulated by a biasing force of said elastic member.

2. The stopping apparatus according to claim 1, wherein said elastic member is disposed to bias a connecting portion between said swing portion and said movable portion.

3. The stopping apparatus according to claim 1, wherein said elastic member is disposed to bias an intermediate portion of said swing portion or an intermediate portion of said movable portion.

4. The stopping apparatus according to claim 1, comprising a regulating portion configured to regulate a pivotal motion of said movable portion with respect to said swing portion in a direction opposite to the predetermined direction.

5. The stopping apparatus according to claim 1, further comprising a guide mechanism configured to guide a pivotal motion of said movable portion when said swing unit is pivoted from the abutment position to the retreat position by said driving unit.

6. The stopping apparatus according to claim 1, wherein said driving unit comprises a pull solenoid.

7. A temporary stopping method in which a stopping apparatus abuts against a work being conveyed to stop the work and then cancels the stop of the work, the stopping apparatus comprising:

a swing unit pivotal about a first pivot shaft downstream of a predetermined stop position in a convey direction of the work between an abutment position at which the swing unit abuts against the work being conveyed at the predetermined stop position to stop conveyance of the work and a retreat position which allows passage of the work;

a driving unit configured to pivot the swing unit from the abutment position to the retreat position; and an elastic member configured to apply a biasing force to the swing unit in a direction to locate the swing unit at the abutment position, wherein the swing unit comprises:

a swing portion pivotal about the first pivot shaft; and a movable portion including an abutment portion configured to abut against the work and pivotally connected to the swing portion through a second pivot shaft parallel to the first pivot shaft, the temporary stopping method comprising:

a stopping step of causing the swing unit positioned at the abutment position by a biasing force of the elastic member to abut against the work being conveyed to stop the work and regulating, by the biasing force of the elastic member, a pivotal motion of the swing unit from the abutment position to the retreat position by an urging force from the work; and a stop canceling step of causing the driving unit to pivot the swing unit from the abutment position to the retreat position and pivoting the movable portion in the predetermined direction relative to the swing portion along with the pivotal motion of the swing unit such that a distance between the first pivot shaft and the abutment portion becomes short.

* * * * *